Jan. 23, 1968  A. E. REVELL  3,364,662
SUPPLY ROLL COVER ARRANGEMENT FOR AIR FILTER APPARATUS
Filed March 8, 1967  2 Sheets-Sheet 1
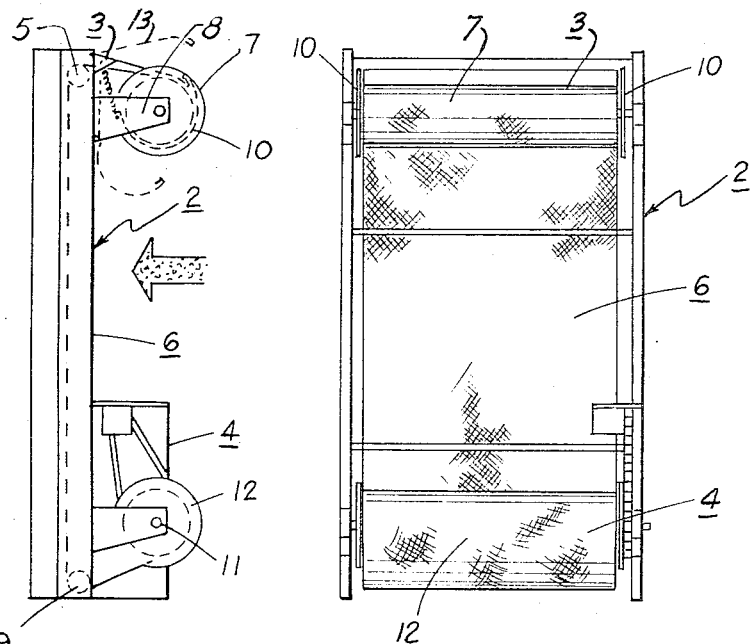
Fig. 1
Fig. 2
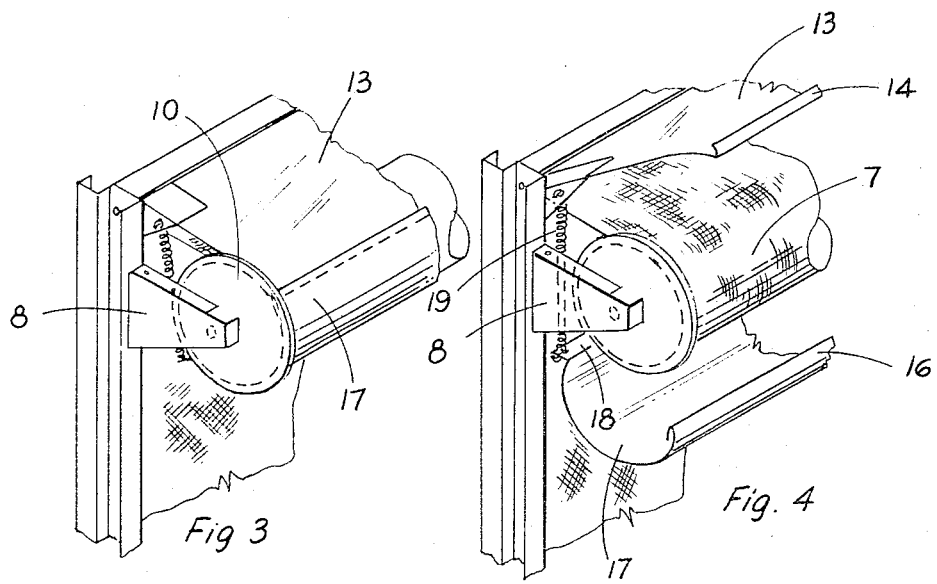
Fig 3
Fig. 4
INVENTOR.
Alan E. Revell
BY
Ralph B. Brick INVENTOR.
Alan E. Revell
BY
Ralph B. Brick

United States Patent Office 3,364,662
Patented Jan. 23, 1968

3,364,662
SUPPLY ROLL COVER ARRANGEMENT FOR
AIR FILTER APPARATUS
Alan E. Revell, Louisville, Ky., assignor to American
Air Filter Company, Inc., Louisville, Ky., a corporation of Delaware
Filed Mar. 2, 1967, Ser. No. 620,022
6 Claims. (Cl. 55—354)

ABSTRACT OF THE DISCLOSURE

A supply roll housing arrangement for gas filter apparatus comprising a cover assembly conformable to a filter medium roll to form a looped protecting shield for the roll, the cover assembly being contractable about the roll as the roll is spent in filtering operations.

Background of the invention

The present invention relates to gas filter apparatus of the type wherein filter medium in roll form is advanced from a supply section through a gas treating section into a take-up section.

Various types of supply section arrangements for such filter apparatus are known in the art. In many of these arrangements the supply section consists merely of a pair of spaced cantilevered arm members extending in horizontal fashion at right angles from the upper portion of the roll housing, the arms having bearing means at their free ends to support a supply roll of filter medium along the dirty gas stream side of the filter apparatus. The surface of the roll so supported is exposed to the gas stream being treated and as filter medium is fed into the treated gas stream that portion of the exposed roll surface is passed to the clean gas treating side of the filter apparatus. To avoid this undesirable consequence, various types of box-like supply sections have been utilized to protect the roll surface in the supply section. For the most part, these past arrangements have been complex and expensive in construction and maintenance, have been cumbersome in operation and storage, and have occupied the same volume of space throughout gas treating operations.

Summary

The present invention provides a novel supply roll cover arrangement for gas filter apparatus which avoids many of the aforementioned disadvantages of past arrangements, which is economical and straightforward in construction, operation and maintenance, which can be readily packaged for storage and shipment and which occupies a reduced volume of space as filtering operations progress.

Various other features of the present invention will become obvious to one skilled in the art upon reading the disclosure set forth hereinafter.

More particularly, the present invention provides, in a gas filter apparatus including a housing having a supply section at one end thereof for storing a web of elongated filter medium mounted in roll form between opposed end plates of a spindle which is supported in cantilever fashion from the housing, a take-up section at the opposite end of the housing to take up spent filter medium, and a gas treating flow through section intermediate the supply and take-up sections, an improved supply section arrangement comprising: a supply roll cover means including first and second portions of preselected breadth and width connectable along adjacent edges in end-to-end alignment, the cover portions when connected being conformable to the filter medium roll between the end plates of the spindle to form a looped protective shield for the filter medium roll to shield the roll from the gas stream passing through the filter section, means to mount the cover portions at their edges opposite the connectable edges to positions adjacent the housing; and, means to contract the shield formed by the cover portions about the filter medium roll as the roll is spent.

It is to be understood that various changes can be made in the arrangement, form and construction of the apparatus disclosed herein by one skilled in the art without departing from the scope or spirit of the present invention.

Referring to the drawings which disclose one advantageous embodiment of the present invention and several novel modifications thereto:

FIGURE 1 is a side elevational view of a gas filter apparatus incorporating the novel supply section arrangement of the present invention;

FIGURE 2 is a front elevational view of the apparatus of FIGURE 1;

FIGURE 3 is an enlarged isometric view of a portion of the apparatus of FIGURE 1, disclosing details of the novel supply section arrangement in operatively closed position;

FIGURE 4 is a view similar to FIGURE 3 disclosing details of the novel supply section arrangement in open position;

Figure 5:
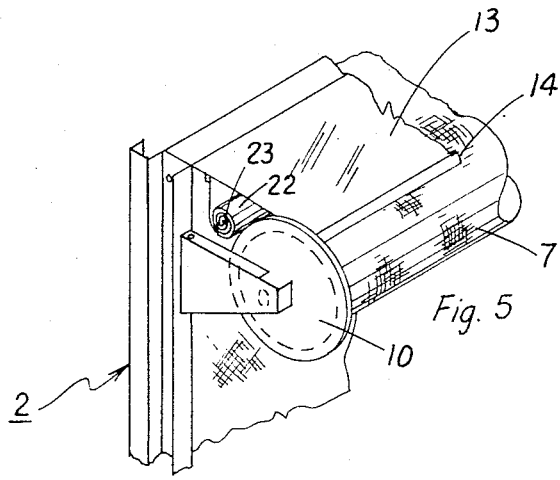
FIGURE 5 is an enlarged isometric view similar to that of FIGURES 3 and 4 disclosing a modification to the present invention.

Referring to FIGURES 1 and 2 of the drawings, a roll type filter housing 2 is disclosed in vertical position. Housing 2, which can be made of a suitable guage sheet metal, includes top filter medium supply section 3 located at one end of the housing, a take-up section 4 located at the opposite end of the housing and a gas treating flow-through section 6 disposed intermediate supply section 3 and take-up section 4. Mounted in wound form in supply section 3 is a web of elongated filter medium in the form of supply roll 7. Roll 7 can be comprised of a web of any one of a number of known suitable filter medium materials. For example, a suitable glass fiber filter material of interconnected and bonded glass fibers can be used. In the embodiment disclosed web 7 is supported in supply section 3 by means of a pair of arms 8 which extend at right angles in cantilevered fashion from housing 2, and which are provided with suitable bearing mounts (not shown) in a manner known in the art.

In operation, web 7 is advanced by suitable drive and control means (not shown in detail) incrementally from time to time over roller 5 into and through gas treating section 6 through which a gas stream to be treated must flow. Web 7 is then correspondingly progressively advanced to take-up zone 4 where it is passed around idle roller 9 and wound upon rewind spools 11 into a roll 12 which can be ultimately thrown away or reconditioned for further use.

In accordance with the present invention and as can be seen more readily in FIGURES 3 and 4, pivotally mounted to the frame of housing 2 in take-up section 3 is top cover portion 13. As shown in FIGURES 3 and 4, cover portion 13, which can be formed from a suitable thin gauge substantially rigid sheet of metal material, is of preselected breadth and width so as to rest in covering relationship on the top portion of roll 7 between end plates 10 of the roll spindle. As can be seen clearly in FIGURE 4, cover portion 13 is provided at its edge opposite that edge pivotally mounted to housing 2 with an outturned lip 14. Lip 14 which forms the connectable edge of cover portion 13 is adapted to engage in interlocking relationship with lip 16 of the connectable edge of cover portion 17. Cover portion 17 also is of preselected breadth and width to rest between end plates 10 in covering relationship with the lower portion of roll 7, the cover portions 13 and 17 when connected in end-to-end alignment through interlocked lips 14 and 16 serving to form a protective shield for roll 7. It is to be noted that cover portion 17, which can be made from similar substantially rigid thin gauge metal material as cover portion 13, is of curved contour to conform to the contour of roll surface 7. It is to be understood that if desired, both cover portions 13 and 17 can be of curved contour or cover portion 17 can be flat and cover portion 13 arranged to include a curved section. It further is to be understood that cover portions 13 and 17 can be integral to form an integral looped sheet.

As can be seen in FIGURES 3 and 4 of the drawings, cover portion 17 is supported at its edge 18 opposite its connectable edge, which includes lip 16, by means of spaced coil springs 19. The coil springs 19 are positioned at opposite extremities of the edge 18, each having one end fastened to edge 18 and the other to cover portion 13 adjacent housing 2. The springs 19 not only serve to support edge 18 of cover portion 17 but also serve to contract the protective shield formed by the cover portions about the filter media roll 7 as roll 7 is spent during filtering operations.

Referring to FIGURE 5, a modified embodiment of the present invention is disclosed wherein instead of rigid cover portion 17 there is provided a cover portion comprising a resilient sheet of flexible plastic material 22. Sheet 22, which can be formed from any one of a number of known plastic-type materials, has the property of being settable in roll form and resiliently yieldable as it is developed in open sheet form. Such plastic type materials are commonly seen in food stores as separators for beverage cartons. Roll sheet cover portion 22, which is of similar preselected breadth and width when in developed form as cover portion 17 for which it substitutes, has one end fixedly mounted to rigid cover portion 13 adjacent housing 2 and the opposite free connectable end set to include a lip 23 adapted to engage in interlocking relationship with lip 14 of cover portion 13 when the rolled sheet is in developed open form. When the cover portions 22 and 13 are so interlocked in end-to-end alignment, a contractable protective shield is provided about filter medium roll 7 as the roll 7 is spent.

Figure 6:
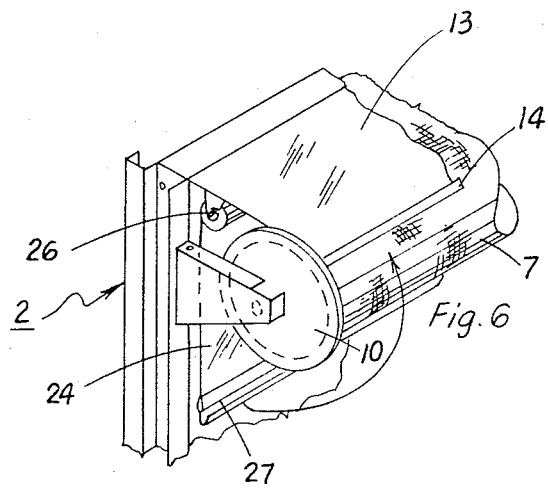
FIGURE 6 is an enlarged isometric view similar to FIGURES 3 and 4 disclosing another modification to the present invention.

Referring to FIGURE 6 of the drawings still another modified embodiment of the present invention is disclosed wherein, instead of rigid cover portion 17 or plastic roll sheet cover portion 22, there is provided flexible cover portion sheet 24 of predetermined length and breadth comparable to cover portions 17 and 22 but mounted on spring loaded mandrel 26 which, in turn, is fastened to cover portion 13 at a position adjacent the frame of housing 2. Spring loaded mandrel 26, which can be like those used for supporting household window shades and therefore not shown in detail, serves to contract cover portion 24 when lip 27 of the cover portion is placed in interlocked engagement with lip 14 of cover portion 13 so as to provide a protective contractable shield about the filter media roll 7 as roll 7 is spent during filtering operations. It will be understood that the setting of the spring loaded mandrel 26 can be adjusted to permit this and also can be adjusted to permit a complete gathering of cover portion 24 into roll form when interlocked lips 27 and 14 are disengaged.

Figure 7:
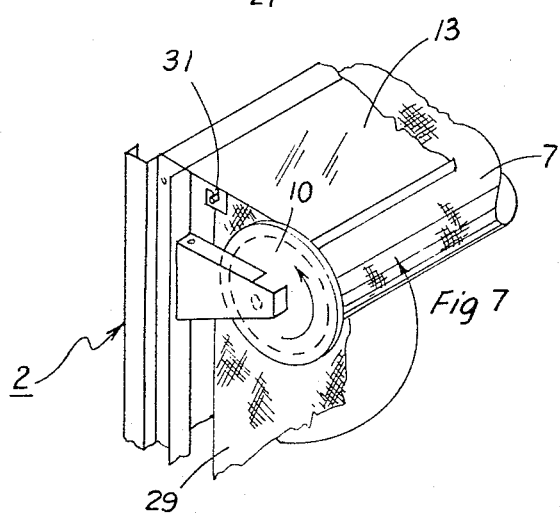
FIGURE 7 is an enlarged isometric view similar to that of FIGURES 3 and 4 disclosing still another modification to the present invention; and, FIGURE 8 is a reduced side view of the apparatus of FIGURE 7, disclosing the apparatus with both cover members in operatively closed position.
Figure 8:
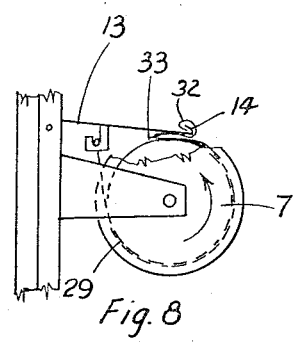

Referring to FIGURES 7 and 8 of the drawings, still another embodiment of applicant's invention is disclosed wherein a flexible sheet of material serves as cover portion 29. The material utilized can be any one of a number of suitable protective cloths, cover portion 29 being suspended at one edge 31 to rigid cover portion 13 at a position adjacent the frame of housing 2. The opposite edge of flexible cover portion 29 is provided with lip 32 which is adapted to engage with lip 14 of rigid cover portion 13 (FIGURE 8). As also can be seen in FIGURE 8, cover portion 29 is of preselected breadth to fit between spindles 10 of roll 7 and is of preselected length to provide a tuck 33. The tuck 33 is insertable between rigid cover portion 13 and the top of filter medium roll 7 so that the cover portion 29 is in snug engagement with the body of roll 7. Accordingly, as the roll of filter material 7 is spent the tuck 33 of cover portion 29 is advanced inwardly as a result of the friction between the roll and cover portion 29. Thus, a contractable protective shield is provided around roll 7.

It is to be understood that cover portion 29 is of a suitable preselected adhesive quality so as to provide the necessary friction between roll 7 and the filter material so that tuck 33 is advanced inwardly as roll 7 is spent.

The invention claimed is:

1. A gas filter apparatus including a housing having a supply section at one end thereof storing a web of elongated filter medium mounted in roll form between opposed end plates of a spindle that is supported in cantilever fashion from said housing, a take-up section at the opposite end of said housing constructed and arranged to take up spent filter medium, and a gas treating flow through section intermediate said supply and take-up sections, an improved supply section arrangement comprising:

a supply roll protective cover means including first and second cover portions of preselected breadth and width connectable along those adjacent edges which extend substantially longitudinally of said roll in end-to-end alignment, said cover portions when connected being conformable to the filter medium roll between said end plates of said spindles to form a looped shield for said filter medium roll to shield said roll from a gas stream passing through said flow through section; means to mount said cover portions at the edges opposite said connectable edges at positions adjacent said housing; and means to contract the shield formed by said cover portions about said filter medium roll as said roll is spent.

2. The apparatus of claim 1, said first and second cover portions being integral at said connectable ends to form an integral looped sheet.

3. The apparatus of claim 1, said cover portions comprising substantially rigid sheets of material with said adjacent edges having inturned and out-turned lip portions adapted to engage in interlocking relationship; said contracting means comprising coil springs fastened at their ends at positions adjacent said housing and at opposite ends to an edge of one of said cover portions.

4. The apparatus of claim 1, one of said cover portions comprising a flexible sheet of material and the other a substantially rigid sheet of material; said contracting means comprising a tuck portion in said flexible cover portion insertable between said rigid cover portion and said filter medium roll to be gathered inwardly as said roll is spent.

5. The apparatus of claim 1, one of said cover portions comprising a flexible sheet of material and the other a substantially rigid sheet of material said contracting means comprising a spring loaded mandrel rotatably mounted on said rigid cover portion adjacent said housing, the edge of said flexible cover portion opposite to its connectable edge being fixed to said spring loaded mandrel for retraction.

6. The apparatus of claim 1, one of said cover portions comprising a resilient sheet of flexible plastic material and the other a substantially rigid sheet of material, said cover portion of plastic material being set in roll form and mounted on said rigid cover portion adjacent said housing so as to be resiliently yieldable as it is developed in sheet form for connection at its connectable end to the connectable end of said rigid cover portion.

References Cited
UNITED STATES PATENTS

| | | | |
|---|---|---|---|
| 976,202 | 11/1910 | Moore | 210—387 |
| 2,106,187 | 1/1938 | Naugler. | |
| 2,521,455 | 9/1950 | Gorgun. | |
| 2,665,812 | 1/1954 | Crane | 210—387 X |
| 2,763,139 | 9/1956 | Callan et al. | 55—354 X |
| 2,797,054 | 6/1957 | Ruch. | |
| 2,848,064 | 8/1958 | Gregory et al. | 55—352 X |
| 2,851,163 | 9/1958 | Anderson | 210—387 |
| 3,007,651 | 11/1961 | Palmore | 55—354 X |
| 3,102,014 | 8/1963 | Aitkenhead | 55—352 X |
| 3,186,474 | 6/1965 | Levitas | 55—351 X |
| 3,296,780 | 1/1967 | Revell | 55—354 |

HARRY B. THORNTON, *Primary Examiner.*

D. TALBERT, *Assistant Examiner.*